United States Patent
Susko

(10) Patent No.: US 9,975,455 B2
(45) Date of Patent: May 22, 2018

(54) RELEASE LEVER COUNTERWEIGHT

(71) Applicant: FORD GLOBAL TECHNOLOGIES, LLC, Dearborn, MI (US)

(72) Inventor: Thomas J. Susko, Saint Clair Shores, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days. days.

(21) Appl. No.: 15/048,444

(22) Filed: Feb. 19, 2016

(65) Prior Publication Data
US 2017/0240070 A1 Aug. 24, 2017

(51) Int. Cl.
*B60N 2/22* (2006.01)
*B60N 2/20* (2006.01)
*B60N 2/42* (2006.01)

(52) U.S. Cl.
CPC .............. *B60N 2/22* (2013.01); *B60N 2/20* (2013.01); *B60N 2/4214* (2013.01)

(58) Field of Classification Search
CPC ........... B60N 2/22; B60N 2/20; B60N 2/4214
USPC ......................................... 297/463.1, 378.11
See application file for complete search history.

(56) References Cited

U.S. PATENT DOCUMENTS

| | | | |
|---|---|---|---|
| 4,223,946 A | 9/1980 | Kluting | |
| 4,390,208 A | 6/1983 | Widmer et al. | |
| 4,429,919 A | 2/1984 | Klueting et al. | |
| 5,425,568 A * | 6/1995 | Sliney ...................... | B60N 2/22 297/378.11 |
| 6,585,324 B2 | 7/2003 | Eppert et al. | |
| 7,070,216 B2 | 7/2006 | Von Zur Muehlen | |
| 2008/0231103 A1* | 9/2008 | Rohee ...................... | B60N 2/20 297/354.1 X |

FOREIGN PATENT DOCUMENTS

JP 2014226994 A 12/2014

OTHER PUBLICATIONS

English Machine Translation of JP2014226994A.

* cited by examiner

*Primary Examiner* — Anthony D Barfield
(74) *Attorney, Agent, or Firm* — Vichit Chea; King & Schickli PLLC

(57) ABSTRACT

A counterweighted release lever for a vehicle seat back release mechanism is described. The release lever includes a counterweight providing sufficient weight to move a center of mass of the release lever towards a release lever pivot point disposed adjacent to the counterweight. The counterweight may be integral to or attached to the release lever, or may be operatively connected to a release lever shaft. Vehicle seat back release mechanisms and vehicle seat assemblies including the counterweighted release lever as described above are described.

13 Claims, 5 Drawing Sheets

RELEASE LEVER COUNTERWEIGHT

TECHNICAL FIELD

This disclosure relates generally to seats for motor vehicles. More particularly, the disclosure relates to a counterweighted vehicle seatback latching mechanism.

BACKGROUND

In certain vehicle seating applications, many seat functions require release of the vehicle seat back latch (recliner). One way this is accomplished is to provide a long release lever operationally connected to a variety of cables, with each cable associated with a particular seat function or method of release. As non-limiting examples, particular cables may be individually associated with a vehicle seat back manual release, power-actuated release, easy passenger entry function, and others.

During a dynamic event such as a collision, a combination of lever orientation with respect to a direction of impact and lever center of gravity can cause the seat back latch/recliner to actuate. That is, typically the center of mass 100 of a seat back recliner lever 102 is distanced from the lever pivot 104 (see FIG. 1A), and so on receipt of a suitable collision impact the lever tends to be displaced in a direction (arrow A) which may actuate the seat back latch/recliner. This inadvertent seat back actuation can create an unsafe situation.

Conventionally, this problem is addressed by including a return spring mechanism to overcome the inertial force of such dynamic events. With reference to FIG. 1B, a seat back recliner lever 102 is shown disposed on a portion of a seat back frame 106. The lever 102 is operationally associated with various cables 107 for actuating various seat functions as described above (seat back manual release, power-actuated release, easy passenger entry function, and others). In such prior art mechanisms, a return spring mechanism 108 is provided to overcome the tendency of the release lever 102 to displace on impact as described above. In this mechanism, a return spring 110 is disposed to counteract the effects of inertia on the release lever 102 encountered during certain impact events.

However, such return spring mechanisms 108 include attendant disadvantages. Because the spring 110 is continuously counteracting the motion of the release lever 102 during a seat back 112 releasing action, the effort required of a user or of an automated mechanism for releasing the seat back 112 is increased. Spring placement is an issue, as the spring 110 must be placed appropriately to provide the desired counteracting function without interfering with other seat mechanisms. Still more, multiple components are required to provide such a return spring mechanism 108, including the spring 110, a seat-mounted bracket 114 for engaging an end of the spring, a release lever tab 116 for engaging an opposed end of the spring, optionally a sleeve 118 for preventing damage to seat materials caused by the spring, and others. Such mechanisms are relatively complex and add to the cost and complexity of manufacture of the various involved components and so of the seat mechanism itself.

To solve the foregoing and other problems, the present disclosure provides a counterweighted seat back release mechanism. Advantageously, the described counterweight replaces the conventional return spring mechanism described above, providing the desired inertia-countering function with a less complex and so more robust and less costly mechanism.

SUMMARY

In accordance with the purposes and benefits described herein, in one aspect of the present disclosure a counterweighted release lever for a vehicle seat back release mechanism is described. The release lever includes a counterweight providing sufficient weight to move a center of mass of the release lever towards a release lever pivot point disposed adjacent to the counterweight.

In embodiments, the counterweight is formed as a portion of the release lever and disposed adjacent to the release lever pivot point. In embodiments the counterweight comprises a bracket portion configured for attaching to a portion of the release lever disposed adjacent to the release lever pivot point. In embodiments the counterweight is attached to a latch release shaft that is operatively connected to the release lever at the release lever pivot point. The counterweight may be fabricated of a material selected from the group consisting of a powdered or sintered metal, a plastic or other polymer, a plastic-overmolded metal, a metal die casting, and a metal stamping.

In other aspects, vehicle seat back release mechanisms and vehicle seat assemblies comprising the counterweighted release lever as described above are provided.

In the following description, there are shown and described embodiments of the disclosed counterweighted seat back release mechanism. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed counterweighted seat back release mechanism, and together with the description serve to explain certain principles thereof. In the drawing.

Reference will now be made in detail to embodiments of the disclosed counterweighted seat back release mechanism, examples of which are illustrated in the accompanying drawing figures.

DETAILED DESCRIPTION

Figure 1A:
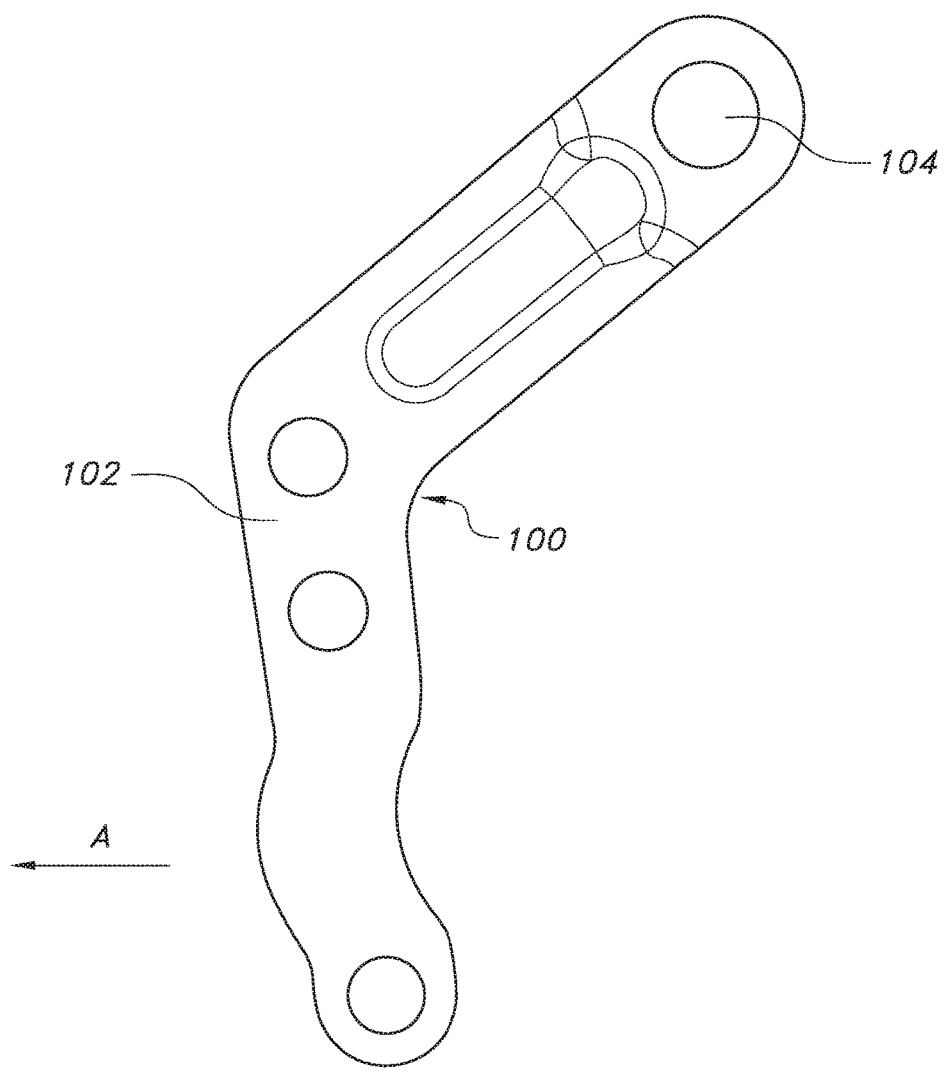
FIG. 1A shows a prior art seat back release lever.
Figure 1B:
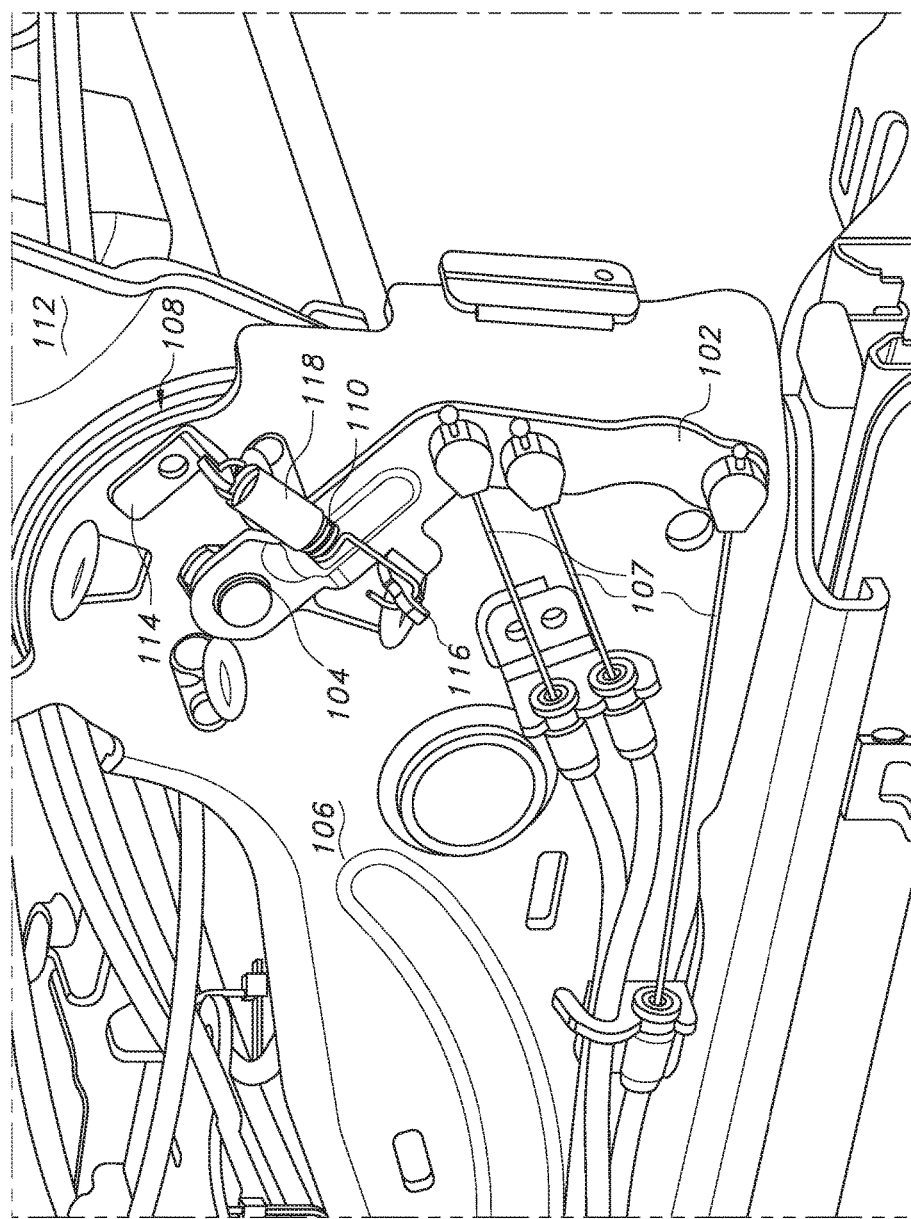
FIG. 1B shows a prior art seat back release mechanism including a return spring.
Figure 2:
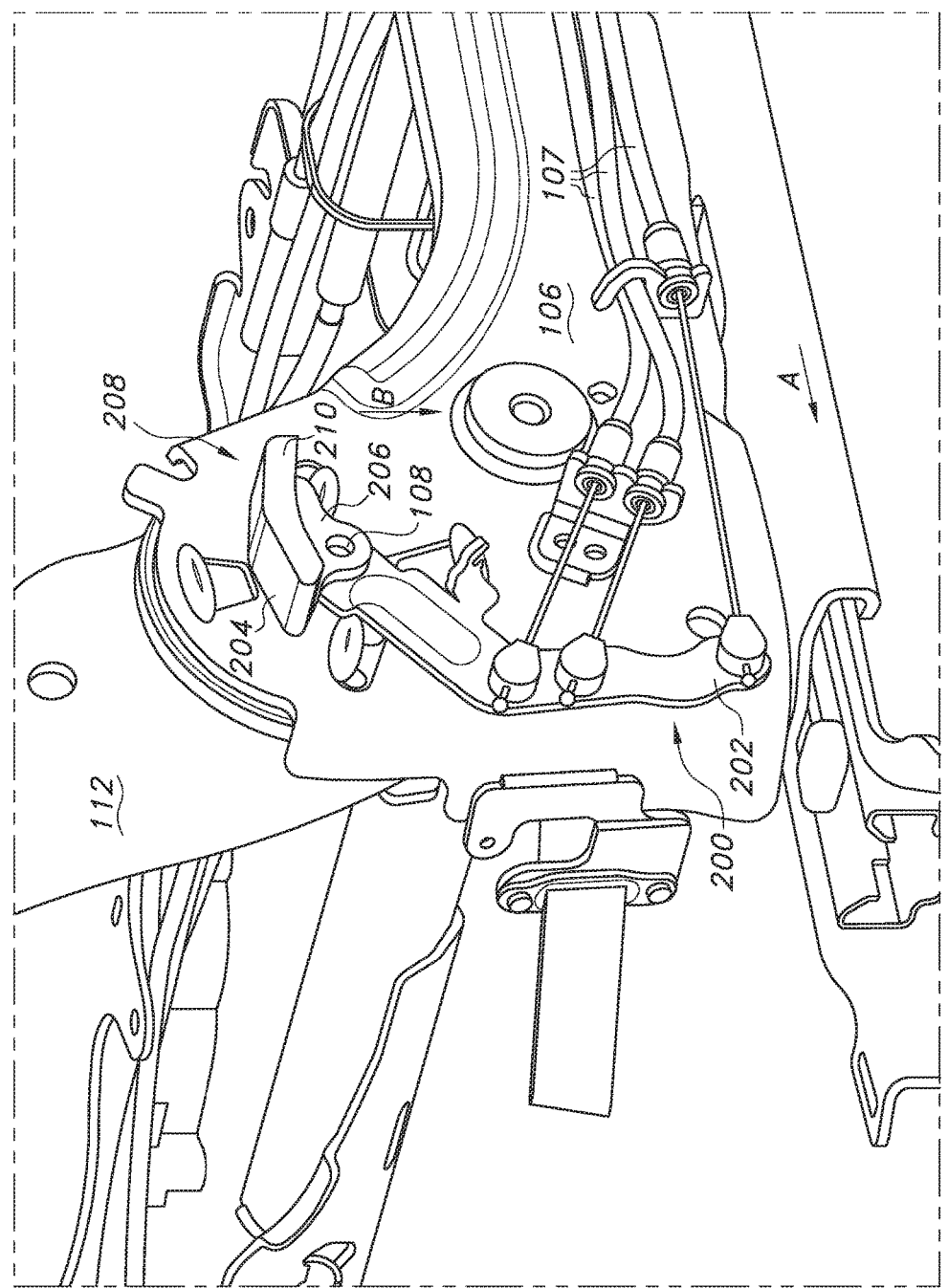
FIG. 2 shows an embodiment of a counterweighted seat back release mechanism according to the present disclosure.

With reference to FIG. 2 there is shown an embodiment of a counterweighted seat back release mechanism 200 according to the present disclosure. As depicted, the release mechanism 200 is disposed outboard of a seat back recliner assembly (not shown). The release mechanism 200 includes a release lever 202, substantially similar in configuration to the prior art release lever described above and operationally connected to various cables 107 as described above for actuating seat functions.

In the depicted embodiment, a counterweight 204 is disposed substantially at a pivot point 108 of the release lever 202. As will be appreciated, the described counterweight 204 replaces the function of the above-described return spring, having sufficient weight to provide a biasing force (arrow B) to the release lever 202 sufficient to overcome the inertia effects of the release lever, i.e. to decrease the moment arm of the lever.

As depicted, the counterweight 204 is defined by a bracket portion 206 and a head portion 208. In the depicted embodiment, the head portion 208 includes an offset portion 210 comprising a sufficient amount of the weight of the counterweight 204 to move the center of mass of the lever 202 towards the lever pivot point 108 and decrease the moment arm of the lever. As will be appreciated, providing the weight of the counterweight 204 including the offset portion 210 as described provides the desired counteracting effect (arrow B) of the counterweight against the lever-actuating inertial force of an impact (arrow A). This occurs because the weight of the counterweight 204 is sufficient to move the lever 202 center of mass towards the lever pivot point 108. It will be appreciated that the offset portion 210 is provided primarily for convenience, i.e. to reduce the vertical "footprint" of the counterweight while still providing the needed biasing force as described above.

Figure 3:
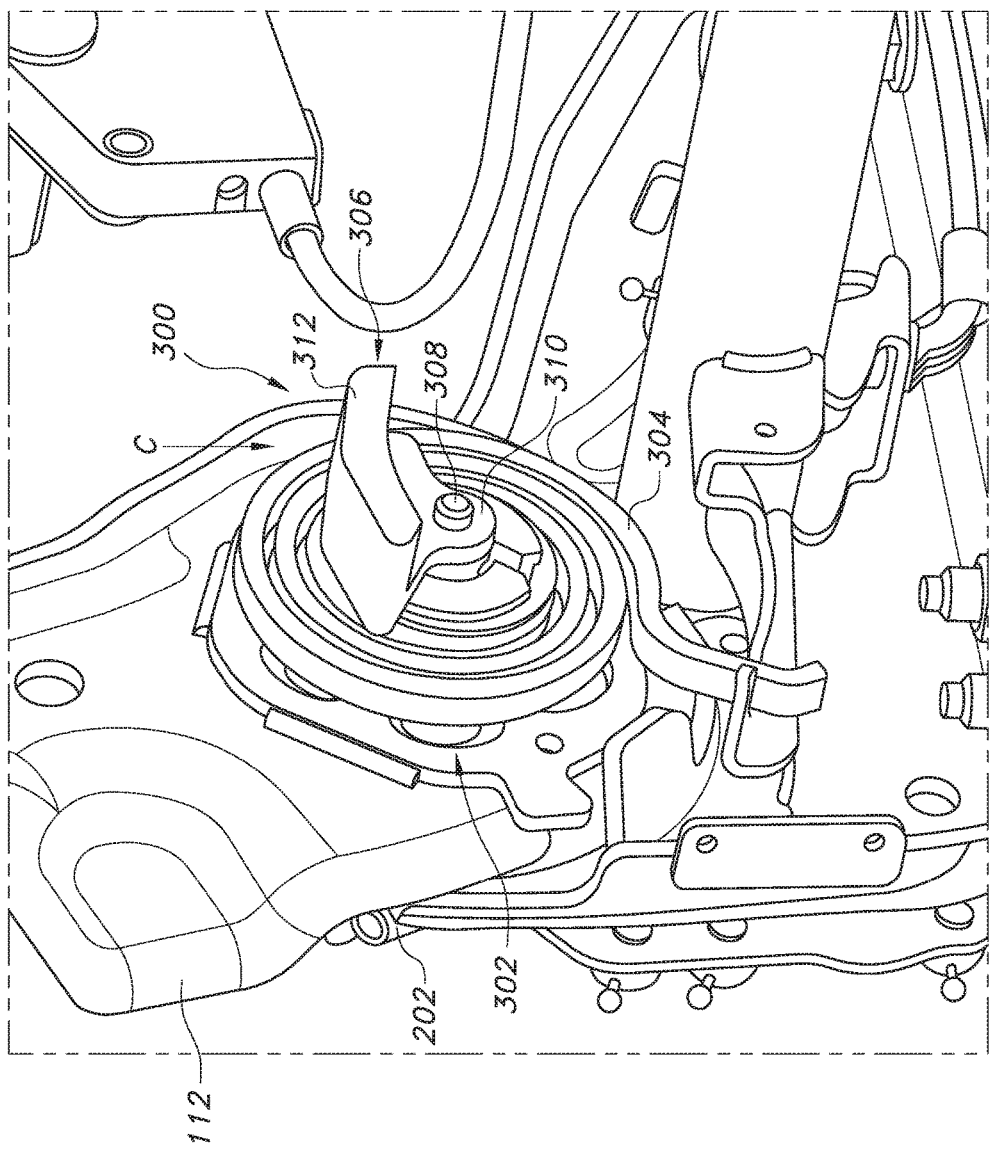
FIG. 3 shows an alternative embodiment of a counterweighted seat back release mechanism according to the present disclosure.

FIG. 3 shows an alternative embodiment of a counterweighted seat back release mechanism 300 according to the present disclosure. As shown, the release mechanism 300 is disposed outboard of a seat back recliner assembly 302, which in the depicted embodiment includes a torsion spring 304 for assisting in folding the seat back 112 towards a flat configuration. A counterweight 306 is provided, attached to a latch release shaft 308 by a bracket portion 310, which latch release shaft in turn is operatively attached to the release lever 202. Again, as shown the counterweight 306 is configured such that a sufficient portion of the weight of the counterweight is positioned to one side of the counterweight at an offset portion 312 to move the vehicle seat back release lever's (not shown in this view) center of mass towards the lever pivot point 108. Thus, the counterweight 306 applies a biasing force (arrow C) to the release lever 202 by the counterweight's biasing force imposed on the spindle 308. The biasing force is sufficient to overcome the inertia effects of the release lever 202.

As will be appreciated, the counterweights 204, 306 should comprise sufficient weight to move the vehicle seat back release lever's respective centers of mass towards the lever pivot point 108 and in a direction opposite the inertial force of an impact tending to actuate the seat back release mechanisms.

A variety of materials are contemplated for fabricating the described counterweights 204, 306, including without intending any limitation powdered or sintered metal, plastic, plastic-overmolded metal, metal stamping, die casting, and others.

Figure 4:
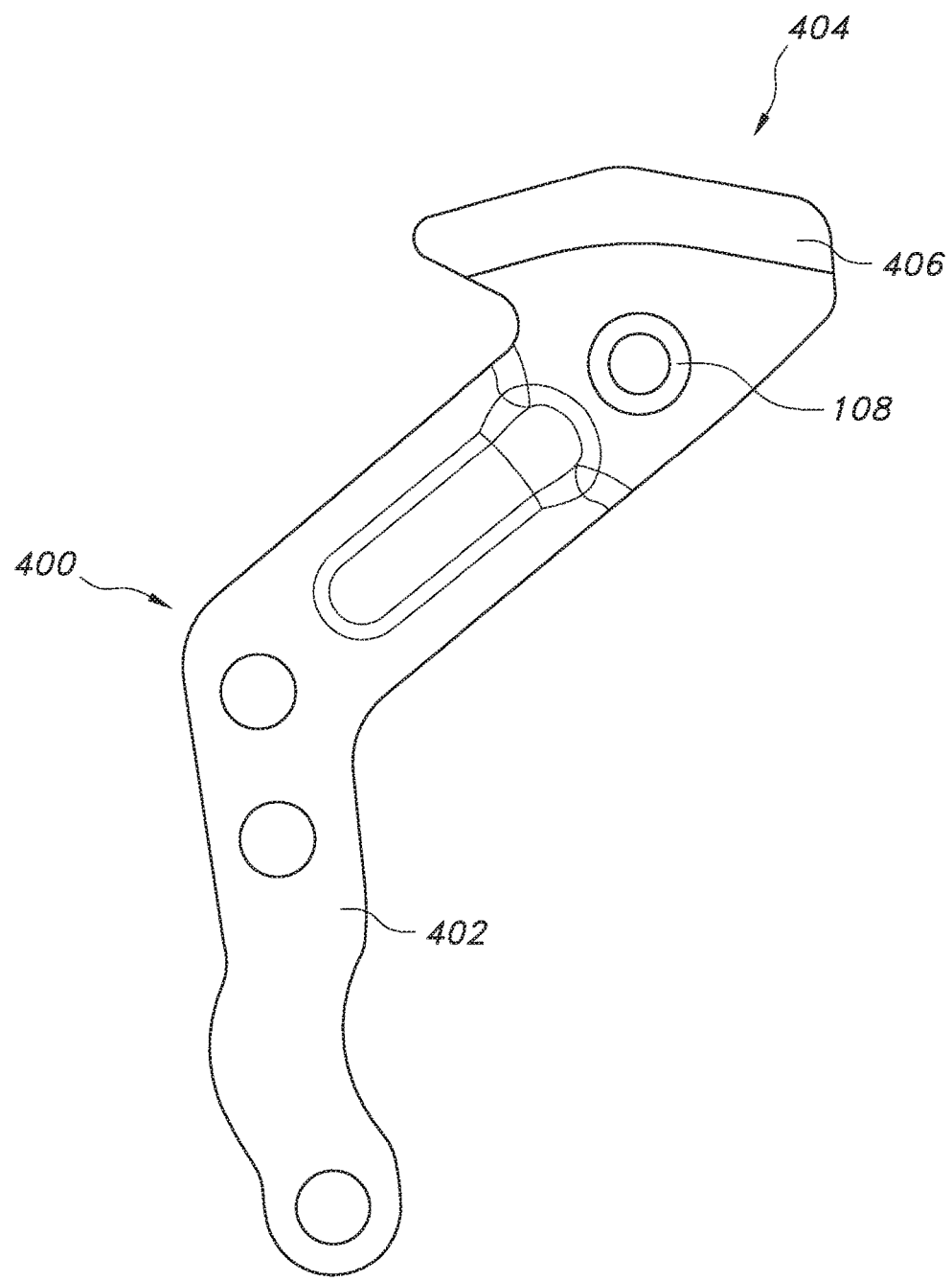
FIG. 4 shows another alternative embodiment of a counterweighted seat back release mechanism according to the present disclosure.

Obvious modifications and variations are possible in light of the above teachings. For example, as depicted the described counterweights 204, 306 are configured for attaching to a portion of a vehicle seat back release mechanism. However, as will be readily appreciated the counterweights could be integrally formed as part of the release mechanism, for example as an integral portion of a release lever 400 as shown in FIG. 4. As depicted, the release lever 400 includes a lever arm 402 including a counterweight 404 provided as an integral element of the lever arm, and disposed substantially at a pivot point 108 of the lever arm. As described above, the counterweight 404 includes an offset portion 406 comprising a sufficient portion of the weight of the counterweight 404 to move the move the vehicle seat back release lever 400's center of mass towards the lever pivot point 108.

All such modifications and variations are within the scope of the appended claims when interpreted in accordance with the breadth to which they are fairly, legally and equitably entitled.

What is claimed:

1. A counterweighted release lever for a vehicle seat back release mechanism, wherein the release lever includes a counterweight providing sufficient weight to move a center of mass of the release lever towards a release lever pivot point disposed adjacent to the counterweight, and wherein the counterweight comprises a bracket portion configured for attaching the counterweight to a position adjacent to the release lever pivot point.

2. The release lever of claim 1, wherein the counterweight is attached to a latch release shaft that is operatively connected to the release lever at the release lever pivot point.

3. The release lever of claim 1, wherein the counterweight is fabricated of a material selected from the group consisting of a powdered or sintered metal, a plastic or other polymer, a plastic-overmolded metal, a metal die casting, and a metal stamping.

4. The release lever of claim 1, wherein the counterweight is attached to a portion of the release lever.

5. A vehicle seat back release mechanism, comprising:
a release lever pivotally mounted to a vehicle seat assembly for movement in a first direction to actuate one or more vehicle seat functions by one or more cables; and
a counterweight disposed to bias the release lever in a second direction counteracting the release lever movement in the first direction, the counterweight providing sufficient weight to move a center of mass of the release lever towards a release lever pivot point disposed adjacent to the counterweight;
further wherein the counterweight comprises a bracket for attaching the counterweight to a position adjacent to the release lever pivot point.

6. The seat back release mechanism of 5, wherein the bracket portion is configured for attaching to a portion of the release lever disposed adjacent to the release lever pivot point.

7. The seat back release mechanism of 5, wherein the bracket portion is configured for attaching to a latch release shaft that is operatively connected to the release lever at the release lever pivot point.

8. The seat back release mechanism of claim 5, wherein the counterweight is fabricated of a material selected from the group consisting of a powdered or sintered metal, a plastic or other polymer, a plastic-overmolded metal, a metal die casting, and a metal stamping.

9. A seat assembly for a vehicle, comprising:
a seat portion comprising a seat bottom and a reclinable seat back;
a seat back release lever pivotally mounted to the seat assembly for movement in a first direction to actuate one or more vehicle seat functions one or more cables; and
a counterweight disposed to bias the release lever in a second direction counteracting the movement of the release lever in the first direction, the counterweight providing sufficient weight to move a center of mass of the release lever towards a release lever pivot point and comprising a bracket for attaching the counterweight to a position adjacent to the release lever pivot point.

10. The seat assembly of claim 9, wherein the counterweight is disposed in an exterior portion of the seat assembly and the bracket portion is configured for attaching to a portion of the release lever disposed adjacent to the release lever pivot point.

11. The seat assembly of claim 9, wherein the counterweight is disposed in an interior portion of the seat assembly and the bracket portion is configured for attaching to a latch release shaft that is operatively connected to the release lever at the release lever pivot point.

12. The seat assembly of claim 9, wherein the counterweight is fabricated of a material selected from the group consisting of a powdered or sintered metal, a plastic or other polymer, a plastic-overmolded metal, a metal die casting, and a metal stamping.

13. A vehicle including the seat assembly of claim 9.

* * * * *

UNITED STATES PATENT AND TRADEMARK OFFICE
CERTIFICATE OF CORRECTION

PATENT NO. : 9,975,455 B2
APPLICATION NO. : 15/048444
DATED : May 22, 2018
INVENTOR(S) : Thomas J. Susko It is certified that error appears in the above-identified patent and that said Letters Patent is hereby corrected as shown below:

In the Claims

Column 4, Line 64, please replace "functions one" with ---functions by one---.

Signed and Sealed this
Thirteenth Day of November, 2018

Andrei Iancu
*Director of the United States Patent and Trademark Office*